United States Patent [19]

Harris

[11] Patent Number: 5,486,694
[45] Date of Patent: Jan. 23, 1996

[54] WOBBLE CORRECTION AND FOCUSING OPTICAL ELEMENT WITH REFRACTIVE TOROIDAL SURFACE AND BINARY DIFFRACTIVE OPTICAL SURFACE

[75] Inventor: Ellis D. Harris, Claremont, Calif.

[73] Assignee: Xerox Corporation, Stamford, Conn.

[21] Appl. No.: 348,415

[22] Filed: Dec. 2, 1994

[51] Int. Cl.⁶ ........................................... H01J 3/14
[52] U.S. Cl. ............................ 250/236; 359/206
[58] Field of Search ........................ 250/234–236; 359/206, 216–219, 711, 563, 569, 741

[56] References Cited

U.S. PATENT DOCUMENTS

| | | | |
|---|---|---|---|
| 4,606,601 | 8/1986 | Starkweather | 359/211 |
| 4,895,790 | 1/1990 | Swanson et al. | 430/321 |
| 5,073,007 | 12/1991 | Kedmi et al. | 359/565 |
| 5,208,701 | 5/1993 | Maeda | 359/574 |
| 5,212,381 | 5/1993 | Appel et al. | 250/236 |
| 5,227,915 | 7/1993 | Grossinger et al. | 359/565 |
| 5,237,451 | 7/1993 | Saxe | 359/565 |

OTHER PUBLICATIONS

W. Veldkamp & T. McHugh, "Binary Optics", *Scientific American*, vol. 266, No. 5, May 1992, pp. 92–97.
G. J. Swanson, "Binary Optics Technology: The Theory and Design of Multi-Level Diffractive Optical Elements", Lincoln Laboratory, Massachusetts Institute of Technology, *Technical Report 854*, 14 Aug. 1989, pp. 1–47.

*Primary Examiner*—Edward P. Westin
*Assistant Examiner*—Que T. Le
*Attorney, Agent, or Firm*—William Propp

[57] ABSTRACT

A wobble correction and focusing optical element for a raster optical scanner combines a toric lens, which provides most of the optical power for focusing the light beam to a scan line, with a binary diffractive optical surface, which corrects the field curvature of the toric lens and which also linearizes the scan. The diffractive surface will have a multi-level structure (binary diffractive optical surface) which possesses a diffractive phase function that will flatten the field curvature of the toric lens.

5 Claims, 4 Drawing Sheets

WOBBLE CORRECTION AND FOCUSING OPTICAL ELEMENT WITH REFRACTIVE TOROIDAL SURFACE AND BINARY DIFFRACTIVE OPTICAL SURFACE

BACKGROUND OF THE INVENTION

This invention relates to a wobble correction and focusing optical element for a raster optical scanner, and, more particularly, to a wobble correction and focusing optical element with a binary diffractive optic surface and a refractive toroidal surface for the post-polygon mirror optics of a raster optical scanner.

Many conventional raster optical scanners utilize a multi-faceted rotating polygon mirror as the scanning element. A collimated beam of light, as, for example, from a laser, strikes the facets of the rotating polygon which causes the reflected light to revolve about an axis near the center of rotation of the rotating polygon and scan a straight line. This reflected light can be utilized to scan a document as the input of an imaging system or can be used to impinge upon a photosensitive medium, such as a xerographic drum, as the output of an imaging system.

The post-polygon optics of the raster optical scanner are the optical elements in the optical path between the facets of the rotating polygon mirror and the scan line of the raster optical scanner.

State of the art raster optical scanners often use motion compensation optics to reduce or eliminate scan line wobble. Motion compensation optics are also referred to as wobble correction optics and also provide the primary means of focusing the light beam upon the scan line in the cross-scan plane.

Wobble is defined as an error in the post-polygon optics of the optical scanning system caused by the rotating facet not being exactly parallel to the vertical axis. The beam reflected from the facet is thereby angled up or down a small amount resulting in scan line displacement errors in the cross-scan direction.

Angular wobble errors can be caused by several factors. The motor or motor bearings driving the rotating polygon mirror can vibrate during operation. The motor shaft can deviate from its rotational axis. The facets of the polygon mirror can be irregular surfaces which do not lie parallel to each other.

Extreme precision in the manufacture of the motor, bearings, motor shaft and polygon mirror can reduce wobble but not eliminate it. Such precision also increases the steps of production and makes mass production of the scanning system virtually impractical and commercially prohibitive in cost.

Another factor in the high cost of correcting wobble is the high fabrication and assembly tolerances required for the optical scanning system to work efficiently and properly.

The prior art raster optical scanning system 10 of FIG. 1 consists of a pre-polygon mirror optical section 12, a rotating polygon mirror 14 with a plurality of facets and a post-polygon mirror optical section 16 to correct for wobble of the rotating polygon mirror.

A laser diode light source 18 emits a coherent light beam 20 which is collimated in both the scan and cross-scan planes by a multi-element optical collimator 22. The resulting collimated beam 20 passes through a cross-scan cylindrical lens 24. This lens 24 is cylindrical in the cross-scan plane and plano in the scan plane. The lens converges the cross-scan portion of the beam while maintaining the collimation of the scan portion of the beam.

The cross-scan cylindrical lens 24, with the light source 18 and collimator 22, are the elements of the pre-polygon mirror optical section 12.

The beam is converging in the cross-scan plane from the cross-scan cylindrical lens 24 which focuses the beam on a facet 26 of the multi-faceted rotating polygon mirror 14 while the scan plane portion of the beam remains collimated when the beam strikes the facet.

The beam reflected from the facet 26 is still collimated in the scan plane and is now diverging in the cross-scan plane. After reflection from the facet, the beam then passes through an f-theta scan lens 28 consisting of a negative plano-spherical lens 30 and a positive plano-spherical lens 32. This f-theta scan lens configuration converges the beam in the scan plane. The beam then passes through a cross-scan cylindrical lens 34.

This lens 34 is cylindrical and negative in the cross-scan plane, causing an additional divergence of the beam, and plano in the scan plane. The primary focus of the beam in the cross-scan plane upon the scan line is achieved by means of the cylindrical mirror 36 which together with the lens 34 constitutes the cross-scan or motion compensation optics 37. These cross-scan optics 37 in conjunction with the f-theta theta lens 28 will flatten the field curvature of the beam in both the scan and cross-scan planes. Thus, the f-theta scan lens together with the cross-scan cylindrical lens produces a linear scan, flat-field beam focussed upon the image plane of the scan line. The f-theta lens 28 is designed with the cross-scan optics 37 because the cross-scan optics may contribute a small, but non-negligible, amount of distortion, especially at large scan angles.

After passing through the cross-scan cylindrical lens 34, the beam is then reflected off a cylindrical wobble correction mirror 36. This mirror 36 is positive and cylindrical in the cross-scan plane and flat in the scan plane. Thus, the wobble mirror converges the previously diverging cross-scan portion of the beam but allows the converging cross-scan portion of the beam focused by the lens 36 to pass through uneffected.

The reflected beam is focussed onto a photoreceptor or a scan line 38 by the mirror 36 which converges the cross-scan portion of the beam and by the f-theta lens 28 which converges the scan portion of the beam.

The f-theta scan lenses 28 with its negative plano-spherical lens 30 and positive plano-spherical lens 32, together with the cross-scan or motion compensation optics 37 with its cross-scan cylindrical lens 34 and the cylindrical wobble correction mirror 36 are the elements of the post-polygon mirror optical section 16.

The f-theta lens in the scan plane and the motion compensation optics in the cross-scan plane combine to bring the light beam to focus at the scan line in both planes. The scan field of the beam is flattened, the scan is linearized and the wobble is compensated. The small residual focus and position errors which may remain are typically negligible in a well-designed raster optical scanner.

The wobble correction, motion compensation and focusing of the post-polygon mirror optical section 16 of the prior art raster optical scanning system 10 is shown in FIGS. 2 and 3. In the scan plane of FIG. 2, the collimated light beam 20 is reflected off the facet 26 of the rotating polygon mirror 14. The reflected beam 20 is weakly diverged by the negative plano-spherical lens 30 and then converged by the positive plano-spherical lens 32 to focus on the scan line 38. The beam passes through the cross-scan cylindrical lens 34 uneffected and is reflected off the cylindrical wobble correction mirror 36 uneffected.

In the cross-scan plane of FIG. 3, the converging beam 20 is reflected off the facet 26 of the rotating polygon mirror 14. The now diverging beam passes through the plano-spherical lens 30 and the plano-spherical lens 32 uneffected. The diverging beam 20 is weakly further diverged by the cross-scan cylindrical lens 34 and then converged by the cylindrical wobble correction mirror 36 to focus on the scan line 38.

In this optical configuration, the initial optical element serves as a corrector for the subsequent optical element in both planes of the post-polygon mirror optical section of the prior art raster optical scanning system. Thus, as shown in the scan plane of FIG. 2, the initial negative plano-spherical lens 30 is a corrector element which weakly diverges the beam before the subsequent positive plano-spherical lens 32 converges and focuses the beam. As shown in the cross-scan plan of FIG. 3, the initial cross-scan cylindrical lens 34 weakly diverges the beam before the subsequent cylindrical wobble correction mirror 36 converges and focuses the beam.

Currently there are three basic types of of optical elements that are used to perform wobble correction in the post-polygon optics of the optical scanning systems: (1) a wobble correction cylindrical mirror, (2) a toric lens, and (3) a cylindrical lens. Each type has its own unique advantages and disadvantages.

The wobble correction mirror contributes to the correction of cross-scan field curvature but imposes some mechanical constraints on the size of the optical scanning system and how the beam is folded onto the scan plane. The toric lens also has a flat cross-scan field and also allows greater freedom and flexibility in the optical scanning system design, and, if an external fold mirror is used, the critical optical components can be confined to a small space. However, the toric lens is difficult to manufacture and is therefore expensive. The cylinder lens is much easier to produce and also reduces the mechanical packaging constraints, but has a large cross-scan field curvature producing a curved scan line.

All three types of wobble correction elements rely on either reflective or refractive surfaces to perform the desired optical transformations. These surfaces may have shapes that are difficult and expensive to fabricate, and may not have all of the desired optical correction characteristics. For laser diode light sources for the optical scanning system, the waveband of light emitted is small enough so that chromatic correction is typically not required for refractive optics used with laser diode sources.

Another type of surface for an optical element uses the process of diffraction to obtain the desired optical transformation characteristics. These diffractive surfaces have surface profiles that can focus and redirect light, and can be designed to have optical correction properties that are not available with easily manufacturable refractive and reflective surface shapes. In addition, many of these diffractive surface profiles can be fabricated using a multi-level profile structure (binary diffractive optics technology) on a flat substrate. Optical elements that use diffractive surfaces are highly dispersive, more dispersive than refractive elements. In fact, they are so dispersive they cannot be used alone as the primary source of optical power in systems that use laser diodes for optical scanning systems.

Binary diffractive optic lenses are formed by etching or molding very shallow and precise steps or grooves into the surface of a transparent optical element. Binary diffractive optic lenses present substantial cost savings over conventional precision glass or plastic optical lenses. Binary optical elements can be fabricated using the same techniques used to fabricate VLSI circuits, as disclosed in *Binary Optics Technology: The Theory and Design of Multi-level Diffractive Optical Elements* by G. J. Swanson of the Lincoln Laboratory at the Massachusetts Institute of Technology, (Technical Report 854, 14 August 1989) and the resulting U.S. Pat. No. 4,895,790. A designer develops an idealized diffractire surface structure mathematically, then using a computer, defines a series of precise, microlithographic masks. A mask pattern is contact printed into a photoresist coating using a UV light source and then transferred into the optical substrate by ion milling or plasma etching.

A wobble correction lens for a raster output scanner combines a positive cross-scan plano-cylindrical lens, which provides most of the optical power for focusing the light beam to a scan line, with a diffractive surface, which corrects the cross-scan field curvature of the cross-scan plano-cylindrical lens in recent Xerox U.S. Pat. No. 5,208,701. The diffractive surface will have a multi-level structure (binary diffractive optical surface) which possesses a diffractive phase function that will flatten the cross-scan field curvature of the plano-cylindrical lens.

However, this diffractire cylindrical wobble correction lens is used in conjunction with an additional f-theta scan lens which may contribute significantly to the cross-scan field curvature of the scanning optical system. This wobble correction lens will also effect the scan linearity. Therefore, this wobble correction lens with a binary diffractive surface and a refractive cylindrical surface should be designed and optimized with the additional f-theta scan lens.

It is an object of this invention to provide a post-polygon optics system with fewer and simpler optical elements to provide the functions of the f-theta lens and the cross-scan cylindrical lens and cylindrical wobble correction mirror that will correct wobble and focus an incident light beam to produce a straight scan line.

It is another object of this invention to provide a wobble correction and focusing optical element that combines a refractive toric lens with a binary diffractive optic lens to correct wobble in the scan line and to focus along the scan line.

SUMMARY OF THE INVENTION

In accordance with the present invention, a wobble correction and focusing optical element for the post-polygon optics of a raster optical scanner combines a toric lens, which provides most of the optical power for focusing the light beam to a scan line, with a binary diffractive optical surface, which corrects the field curvature of the toric lens in both planes. The diffractive surface will have a multi-level structure (binary diffractive optical surface) which possesses a diffractive phase function that will flatten the field curvature of the toric lens and linearize the scan.

The wobble correction and focusing optical element can have a refractive toroidal surface and a binary diffractive optic surface for a raster output scanner. The wobble correction and focusing lens can be a refractive toric lens bonded to a binary diffractive optical lens or a wobble correction and focusing lens system can consist of the refractive toric lens spaced apart from the binary diffractive optical lens.

Other objects and attainments together with a fuller understanding of the invention will become apparent and appreciated by referring to the following description and claims taken in conjunction with the accompanying drawings.

DESCRIPTION OF THE PREFERRED EMBODIMENT

Figure 1:
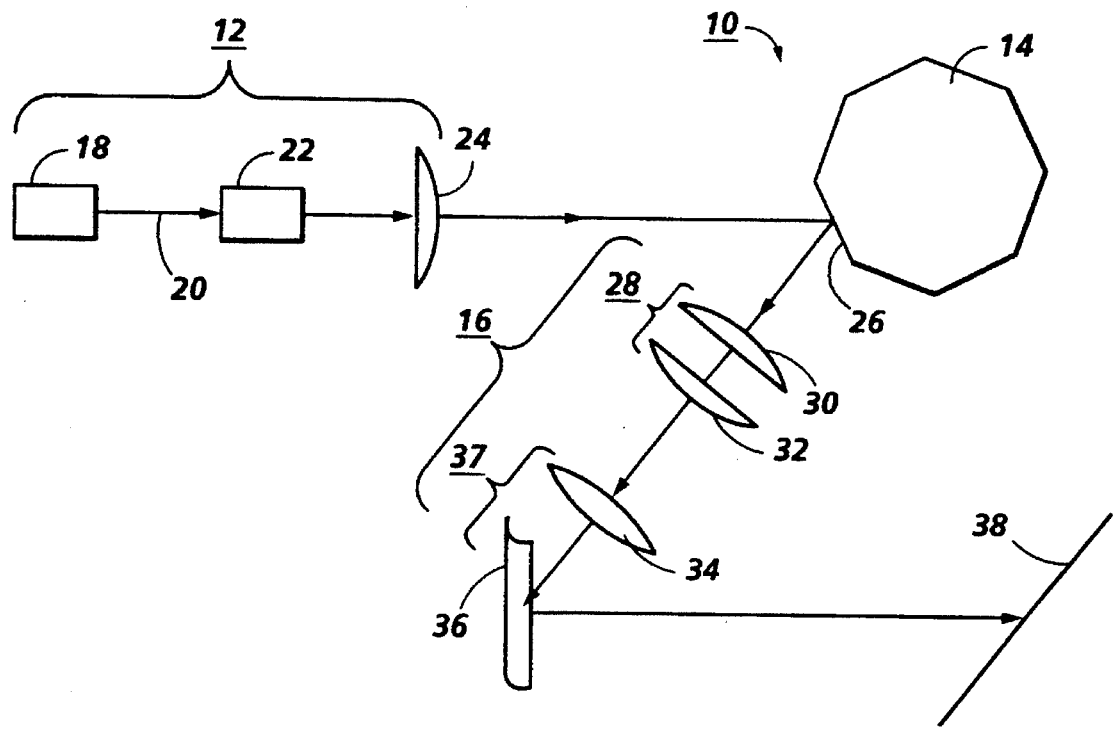
FIG. 1 is a schematic illustration of the cross-section view of a prior art raster optical scanner.
Figure 2:
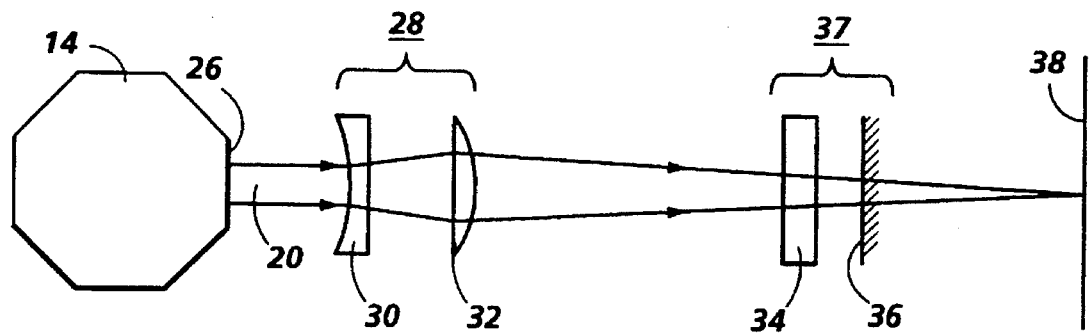
FIG. 2 is a schematic illustration of the cross-section side view of the post-polygon optics in the scan plane of the prior art raster optical scanner of FIG. 1.
Figure 3:
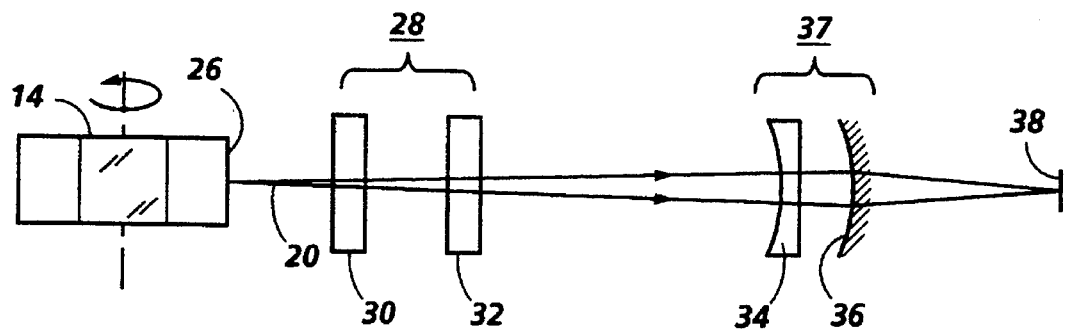
FIG. 3 is a schematic illustration of the cross-section side view of the post-polygon optics in the cross-scan plane of the prior art raster optical scanner of FIG. 1.
Figure 4:
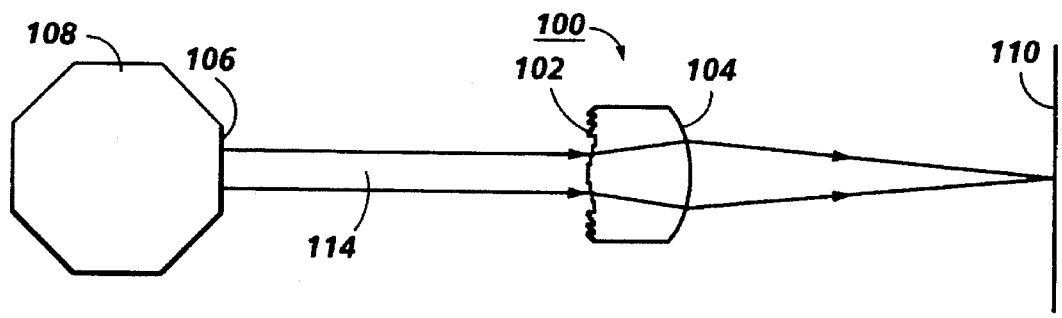
FIG. 4 is a schematic illustration of the cross-section side view of the wobble correction and focusing optical element with a binary diffractive optical surface and a refractive toroidal surface for the post-polygon optics in the scan plane of a raster optical scanner formed according to the present invention.
Figure 5:
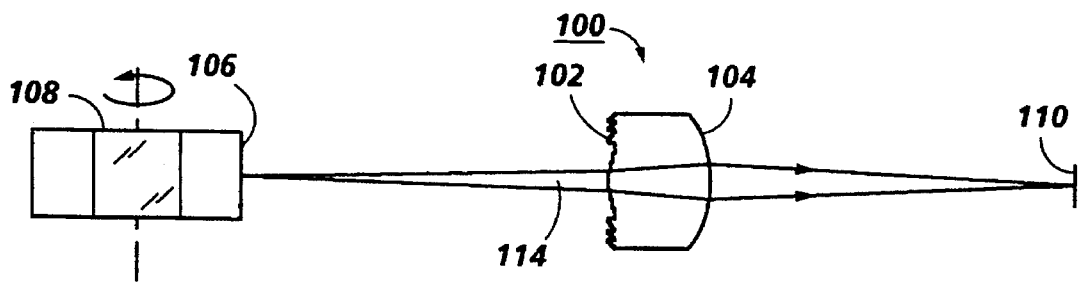
FIG. 5 is a schematic illustration of the cross-section side view of the wobble correction and focusing optical element with a binary diffractive optical surface and a refractive toroidal surface for the post-polygon optics in the cross-scan plane of a raster optical scanner formed according to the present invention.

Reference is now made to FIGS. 4 and 5, wherein there is illustrated a wobble correction and focusing optical element 100 with a binary diffractive optical surface 102 and a refractive toroidal surface 104 of this invention. The wobble correction and focusing optical element 100 is in the post-polygon optical path between the facets 106 of the rotating polygon mirror 108 and the scan line 110 of a raster optical scanning system. The light source and pre-polygon optics will be the same in a raster optical scanner using the optical element 100 as those used with other post-polygon optics as in a typical prior art raster optical scanner.

The wobble correction and focusing optical element 100 has a toroidal surface 104 which is anamorphic (cylindrical) in both the scan and cross-scan planes with different refractive powers in the scan and cross-scan planes, as seen in FIGS. 4 and 5. The toroidal surface 104 will focus a scanning beam to a scan line. Opposite to the toroidal surface 104 is a plano surface 112 which is flat in both the scan and cross-scan direction.

The binary diffractive optical surface 102 is the incident surface for any scanning beam reflected from the facets of the rotating polygon mirror. The binary diffractire optical surface corrects the field curvature of the toroidal surface.

The wobble correction and focusing optical element 100 is typically fused silica (artificial quartz). The lens may also be glass, quartz, germanium, silicon, or any material that will transmit light in the desired wavelength.

The toroidal surface 104 and the plano surface 112 are fabricated by conventional means such as molding or grinding to form a toric lens.

A binary diffractive optic lens element 102 is formed on the plano surface 112 of the toric lens by photolithographic etching. In general, the etching process involves coating the substantially flat surface 112 with a photoresist layer, exposing the photoresist layer through a mask with the negative of the binary diffractive optic lens pattern, developing the photoresist layer and etching the surface forming the binary diffractive optic lens pattern in the surface 112 of the optical element 100.

In the preferred embodiment, the surface 112 is chemically cleaned and polished. On the surface 112 of the optical element 100, a mask for the binary diffractire optic lens pattern is printed on the surface using a conventional photolithographic photoresist. The non-masked areas on the surface 112 of the lens 100 are etched by reactive ion etching to fabricate the grooves or steps of the binary diffractire optic lens element 102. The reactive ion etching takes about one to twenty minutes. The etching depth depends upon the surface area exposed to the etchant. The remaining photoresist is then removed. The masking and etching steps can be repeated several times.

A possible photoresist layer is KTI 820 having a thickness of about 0.5 to 10 microns spin coated on the surface 112 of the basic toric lens 104. The masking and etching may also be made by electron beam lithography or by chemical ion etching or by ion bombardment or by UV lithography.

The only requirements for the material for the optical element 100 is that the material need only transmit the wavelength of the light source for the scanning system and that the material take the pattern for the binary diffractive optic lens element 104.

The wobble correction and focusing optical element 100 combines a toric lens, which provides most of the optical power for focusing the light beam to a scan line in the scan and cross-scan planes, with a diffractive surface, which corrects the field curvature of the toric lens and linearizes the scan. The diffractive surface will have a multi-level structure (binary diffractive optical surface) which possesses a diffractive phase function that will flatten the field curvature of the cross-scan toric lens. Used in this manner, the power of the diffractive surface will not be large enough to require chromatic correction for the wavelengths of the light source.

The binary diffractive optic lens element 102 and the refractive toroidal surface 104 of the wobble correction and focusing optical element 100 can be coated with an antireflective coating to improve transmission of light beams.

The wobble correction and focusing of the optical element 100 is shown in FIGS. 4 and 5. In the scan plane of FIG. 4, the collimated light beam 114 is reflected off the facet 106 of the rotating polygon mirror 108. The reflected beam 114 is weakly diverged by the binary diffractive optical surface 102, passes through the optical element 100 diverging and then converged by the toroidal surface 104 to focus on the scan line 110.

In the cross-scan plane of FIG. 5, the diverging beam 114 is reflected off the facet 106 of the rotating polygon mirror 108. The diverging beam 114 is weakly further diverged by the binary diffractive optical surface 102, passes through the optical element 100 diverging and then converged by the toroidal surface 104 to focus on the scan line 110.

The refractive powers of the toroidal surface 104 are stronger in the cross-scan plane than the scan plane since the toric lens has to converge and focus a diverging beam in the cross-scan plane and only a collimated beam in the scan plane.

In this optical configuration, the initial optical element of a binary diffractive optical surface serves as a corrector for the subsequent optical element of a refractive toroidal surface in both planes of the post-polygon mirror optical section of the raster optical scanning system.

The combination of the binary diffractive optical element and the refractive toric element serves to flatten the scan field, linearize the scan and bring the light beam to a focus in both planes at the scan line.

Figure 6:
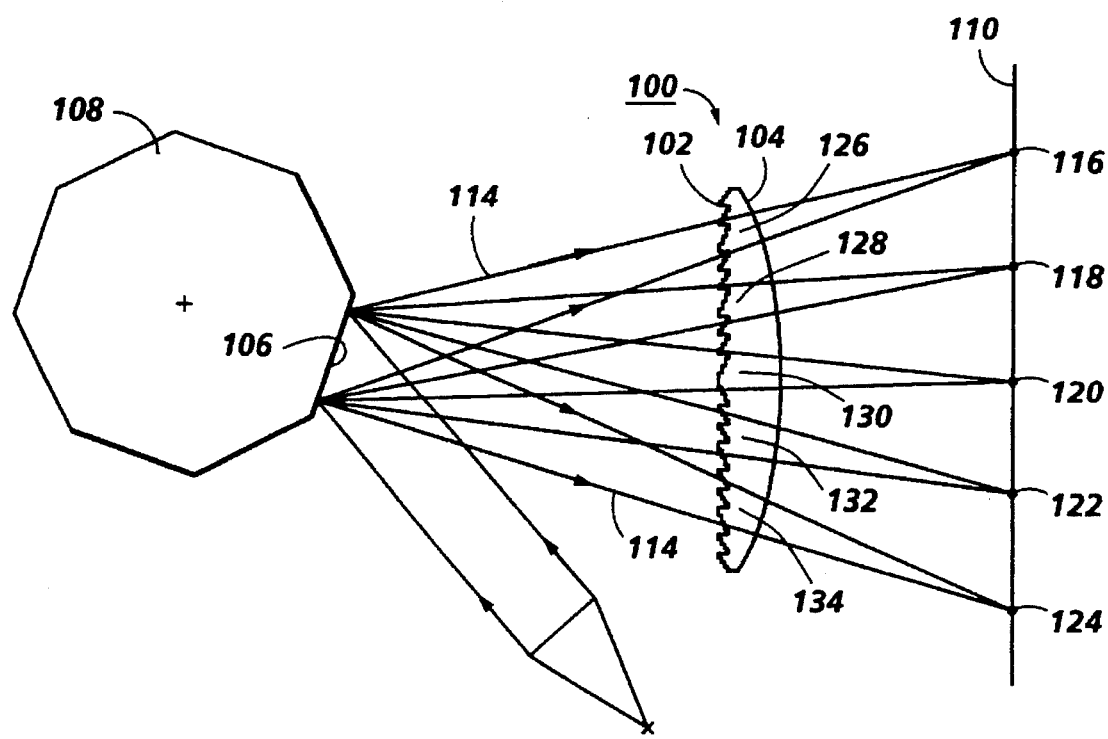
FIG. 6 is a schematic illustration of the cross-section side view in the scan plane of the wobble correction and focusing optical element during operation of the raster optical scanner formed according to the present invention.
Figure 7:
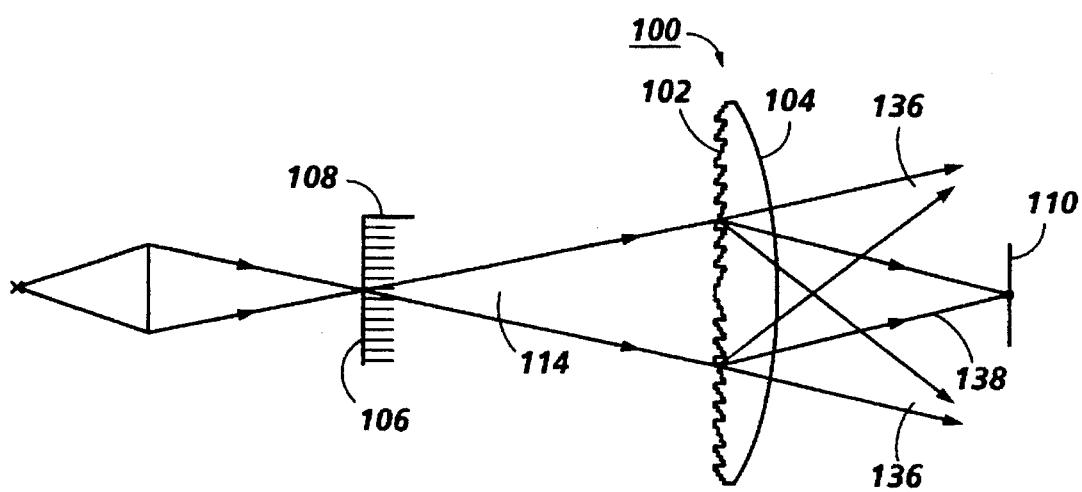
FIG. 7 is a schematic illustration of the cross-section side view in the cross-scan plane of the wobble correction and focusing optical element during operation of the raster optical scanner formed according to the present invention.

The wobble correction and focusing of the optical element 100 during operation of the raster optical scanner is shown in FIGS. 6 and 7. The rotating facets 106 of the polygon mirror 108 will reflect a beam of light 114 across an arc to form the scan line 110.

In the scan plane of FIG. 6, the light 114 reflected from the facets 106 of the rotating polygon mirror 108 is to scan along the scan line 110. The scan line can be thought of as a series of points 116, 118, 120, 122 and 124. The light is refracted by the wobble correction and focusing optical element 100 and is diffracted and refracted by the corresponding sections 126, 128, 130, 132 and 134 of the binary diffractive optical surface and primarily by the refractive toroidal surface to the corresponding points 116, 118, 120, 122 and 124 along the scan line. The light 114 incident upon the section 126 of the wobble correction and focusing optical element 100 will be focused on point 116 of the scan line et seq.

Light reflected from a rotating facet of a polygon mirror will form an arc of F Tan$\Theta$. The scan line must be a straight line. The binary diffractive optical surface must include a continuously variable wedge to move the light 114 from F Tan$\Theta$(:resulting in an arc) to F$\Theta$ (resulting in a straight line). Thus, each section of the binary diffractive optical surface will diffract the light beam so that the refractive toroidal surface can focus the light on the corresponding point along the straight scan line.

The effective focal length of the binary diffractive optical surface must vary as a function of the scanning beam position along the scan line. It may be continuously variable over the scan or it may be one value for the scan plane and another value for the cross-scan plane.

In the cross-scan plane of FIG. 7, the binary diffractive lens 102 will focus the beam 114 reflected from the facets 106 of the rotating polygon mirror 108 to focus the beam to a point on the scan line 110. The effective focal length of the binary diffractive optical surface must also vary along the length of the optical element 100.

The binary diffractive optical surface will also induce scatter loss 136 (the other diffraction orders) to the beam 114 to control the intensity of the resulting diffracted beam 138 along the scan line. The intensity can be controlled to provide a uniform intensity to the beam 138 along the length of the scan line 110.

An alternate method of forming the binary diffractive optic lens surface on the wobble correction and focusing optical element is by a conventional molding process. In general, the molding process involves pressing a mold with the negative of the binary diffractive optic lens pattern into a substantially flat, soft coating, such as a plastic or polymer or other organic material, on the plano surface of the toric lens forming the binary diffractive optic lens pattern in the coating. The mold is typically nickel. The coating must be able to be mold pressed, be optically transmissive and be able to retain the binary diffractive optic lens pattern so that the element will operate optically. The hard substrate is typically fused silica (artificial quartz). The substrate may also be glass, quartz, germanlure, silicon, or any material that will transmit light in the desired wavelength.

Figure 8:
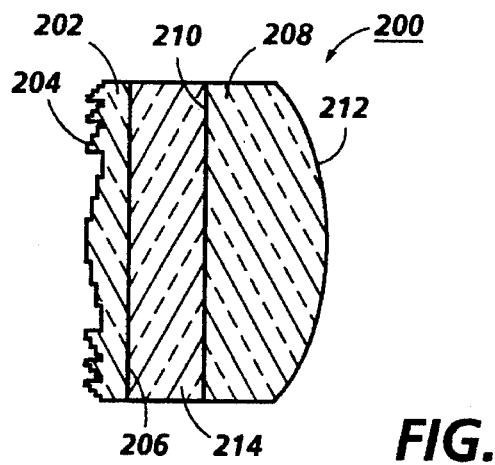
FIG. 8 is a schematic illustration of the cross-section side view of an alternate embodiment of the wobble correction and focusing optical element with a binary diffractive optical surface and a refractive toroidal surface for a raster output scanner formed according to the present invention.

The wobble correction and focusing optical element 200 of FIG. 8 consists of a binary diffractive optical lens 202 with a binary diffractive optic lens surface 204 and a plano or flat surface 206 and a refractive toric lens 208 with a flat or plano surface 210 and a toroidal surface 212. The binary diffractive optic lens surface 204 is formed on the lens 202 by photolithography or molding as discussed previously. The plano surface 206 of the binary diffractive optic lens 202 is bonded to the plano surface 210 of the refractive toric lens 208 by conventional bonding means 214.

The means 214 of bonding the two lenses together can typically be either by epoxy resin or by polyimide. The epoxy resin bond is approximately 2 microns thick while the polyimide bond is approximately 10 to 35 microns thick.

The viscous and liquid bonding means is applied to one plano surface 206 or 210 of either the binary diffractive optic lens or the refractive toric lens only, then the substrates are aligned, pressed together, and the bonding means is cured.

Certain polyimide and thermal setting epoxy resins may require heat curing. Materials for the lens must be selected which would not be effected by the heat curing temperature. Ultraviolet setting epoxy resin is faster to set. The bonding means should be transmissive to the wavelengths of the light source.

Alignment markings can be used to align the binary diffractive optic lens with the corresponding toric lens. At least two alignment markings can be photolithographically produced at predetermined locations on one or both of the lenses.

The wobble correction and focusing optical element 200 of FIG. 8 will correct the wobble and field curvature and focus an incident beam of light for a straight scan line just as the wobble correction lens 100 of FIGS. 4 and 5. An incident light beam would pass through the binary diffractive optic lens surface 204 of the lens 202 and the plano surface 206 first. The light beam would then pass through the bonding means 214, then through the plano surface 210 of the lens 208 and the toroidal surface 212 to focus the beam on a straight scan line without field curvature and without wobble.

Figure 9:
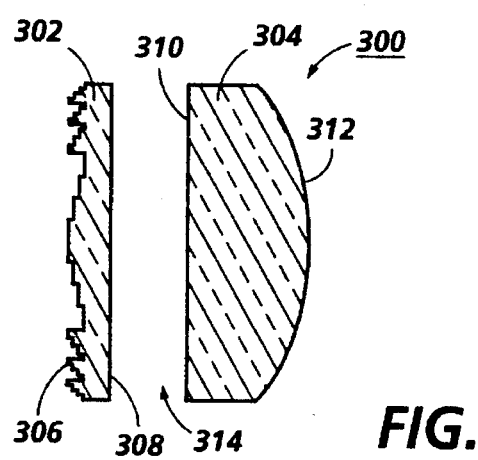
FIG. 9 is a schematic illustration of the cross-section side view of a wobble correction and focusing lens system with a binary diffractive optic lens and a refractive toric lens for a raster output scanner formed according to the present invention.

The wobble correction and focusing lens system 300 of FIG. 9 consists of a binary diffractive optical lens 302 and a refractive toric lens 304. The binary diffractive optical lens 302 has a binary diffractive optic lens surface 306 and a plano or flat surface 308 formed as previously discussed. The refractive toric lens 304 has a flat or plano surface 310 and a toroidal surface 312. The two lens 302 and 304 of the wobble correction and focusing lens system 300 are spaced apart.

The wobble correction and focusing lens system 300 of FIG. 9 will correct the wobble and field curvature and focus an incident beam of light for a straight scan line just as the wobble correction lens 100 of FIGS. 4 and 5. An incident light beam would pass through the binary diffractive optic lens surface 304 and the plano surface 306 of the lens 302 first. The light beam would then pass through the air gap 314 between the lenses, then through the plano surface 308 and the toroidal surface 310 of the lens 304 to focus the beam on a straight scan line without field curvature and without wobble.

The two element wobble correction and focusing system 300 of a binary diffractive optical lens and a toric lens would have the same properties as the single element wobble correction and focusing lens as discussed previously. This two element system may be a desirable alternative depending upon the manufacturing considerations involved in producing the binary diffractive optical lens and the toric lens.

Binary diffractire optical lenses are susceptible to dirt, oil films from handling and loose particles, all of which can interfere optically with the lens. A major concern with binary diffractive optical lenses is protection of the patterned surface of the lenses.

Figure 10:
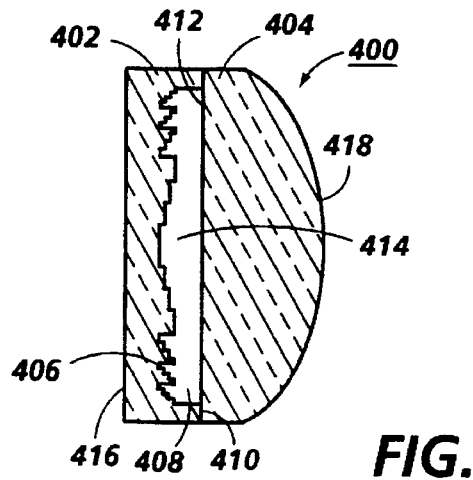
FIG. 10 is a schematic illustration of the cross-section side view of another alternate embodiment of the wobble correction and focusing optical element with a binary diffractive optic surface and a refractive toroidal surface for a raster output scanner formed according to the present invention.

In the wobble correction and focusing lens system 400 of FIG. 10 with a binary diffractive optical lens 402 and a toric lens 404, the binary diffractive optical lens surface 406 is formed in a recess 408 of the binary diffractive optical lens 404. The recessed lens surface side 410 of the binary diffractive optical lens 404 is then bonded to the plano side 412 of the toric lens 404. The binary diffractive optical lens surface 406 will be separated by an air gap 414 from the side 412 of the toric lens.

The wobble correction and focusing lens system 400 of FIG. 10 will correct the wobble and field curvature and focus an incident beam of light for a straight scan line just as the wobble correction lens 100 of FIGS. 4 and 5. An incident light beam would pass through the plano side 416 of the binary diffractive optical lens 404 first, then through the binary diffractive optical lens surface 406 in the recess 408. The light beam would then pass through the air gap 414 between the lenses, then through the plano surface 412 and the toroidal surface 418 of the lens 404 to focus the beam on a straight scan line without field curvature and without wobble.

The recess can be formed by conventional molding or etching as discussed previously. The recess is etched or molded to only as great a depth as necessary for bonding the lenses together. An adhesive coating or other bonding means is applied to the raised surface of the binary diffractive optical lens in such a manner that it does not run or spread into the recess.

The interior and exterior surfaces 416, 406, 412 and 418 of both lenses 402 and 404 can be coated with an antireflective coating to improve transmission of light beams.

The bonding means need not be transmissive to the incident light beam. The binary diffractive optical lens surface in the recess and the toric lens are light transmissive while the non-transmissive bonding means could serve to absorb incident light. Thus, the only light transmitted through the recess would be the light focussed and diffracted by the binary diffractive optic lens. The absorptive bonding means would prevent transmission of extraneous light through the wobble correction and focusing lens system 400.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. An optical scanning system for wobble correction and focusing a light beam at a scan line comprising:

a rotating polygon mirror with a plurality of facets, means for generating a collimated light beam directed onto one of said facets, and an optical element which focuses said light beam reflected off said one of said facets to a scan line and corrects for wobble of said light beam at said scan line, said optical element comprising a binary diffractive optical surface and a refractive toroidal lens surface.

2. The optical scanning system for wobble correction and focusing a light beam at a scan line of claim 1 wherein said refractive toroidal lens surface is a toric lens and said binary diffractive optical surface is on the flat surface of said toric lens opposite said refractive toroidal lens surface.

3. An optical scanning system for wobble correction and focusing a light beam at a scan line comprising:

a rotating polygon mirror with a plurality of facets, means for generating a collimated light beam directed onto one of said facets, and an optical element which focuses said beam reflected off said one of said facets to a scan line and corrects for wobble of said light beam at said scan line, said optical element comprising a binary diffractive optical lens and a refractive toric lens, and bonding means for securing a plano surface of said binary diffractive optical lens to a plano surface of said refractive toric lens.

4. An optical scanning system for wobble correction and focusing a light beam at a scan line comprising:

a rotating polygon mirror with a plurality of facets, means for generating a collimated light beam directed onto one of said facets, and a lens system which focuses said beam reflected off said one of said facets to a scan line and corrects for wobble of said light beam at said scan line, said lens system comprising a binary diffractive optical lens and a refractive toric lens.

5. The optical scanning system for wobble correction and focusing a light beam at a scan line of claim 4 wherein the binary diffractive optical surface of said binary diffractive optical lens is in a recess and further comprising bonding means for securing said binary diffractive optical surface of said binary diffractive optical lens in a recess to a plano surface of said refractive toric lens.

* * * * *